United States Patent
Yi et al.

(10) Patent No.: US 10,462,804 B2
(45) Date of Patent: Oct. 29, 2019

(54) METHOD AND APPARATUS FOR SUPPORTING COEXISTENCE IN UNLICENSED BAND AMONG CELLS OF DIFFERENT OPERATORS IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 15/329,816

(22) PCT Filed: Sep. 14, 2015

(86) PCT No.: PCT/KR2015/009632
§ 371 (c)(1),
(2) Date: Jan. 27, 2017

(87) PCT Pub. No.: WO2016/039599
PCT Pub. Date: Mar. 17, 2016

(65) Prior Publication Data
US 2018/0132259 A1    May 10, 2018

Related U.S. Application Data

(60) Provisional application No. 62/049,370, filed on Sep. 12, 2014, provisional application No. 62/056,442, filed on Sep. 26, 2014.

(51) Int. Cl.
*H04W 72/12* (2009.01)
*H04L 5/00* (2006.01)
(Continued)

(52) U.S. Cl.
CPC ....... *H04W 72/1215* (2013.01); *H04L 5/0048* (2013.01); *H04L 41/0803* (2013.01);
(Continued)

(58) Field of Classification Search
CPC . H04W 72/1215; H04W 16/14; H04W 48/16; H04W 72/0453; H04W 74/006;
(Continued)

(56) References Cited

U.S. PATENT DOCUMENTS

2004/0165547 A1* 8/2004 Lopes ................. H04B 7/2615
370/328
2013/0017794 A1    1/2013 Kloper et al.
(Continued)

FOREIGN PATENT DOCUMENTS

CN           102265692 A       11/2011
WO     WO 2013/017794 A2       2/2013
(Continued)

OTHER PUBLICATIONS

RWS-140031, presented at 3GPP Meeting, titled, "LTE in unlicensed spectrum", in Sophia Antipolis, France, (RWS-140031 hereinafter) was published on Jun. 19, 2014.*
(Continued)

*Primary Examiner* — Zhiren Qin
(74) *Attorney, Agent, or Firm* — Birch, Stewart, Kolasch & Birch, LLP

(57) ABSTRACT

A method and apparatus for communicating with a long-term evolution in unlicensed spectrum (LTE-U) base station (BS) in a wireless communication system is provided. A user equipment (UE) receives a configuration of a potential transmission time unit (P-TTU), communicates with a first LTE-U BS of a first operator based on the configured P-TTU, and communicates with a second LTE-U BS of a second operator based on the configured P-TTU. The com-
(Continued)

munication with the first LTE-U BS and the communication with the second LTE-U BS is multiplexed by time division multiplexing (TDM).

10 Claims, 6 Drawing Sheets

(51) Int. Cl.
| | | |
|---|---|---|
| *H04W 48/16* | (2009.01) | |
| *H04W 72/04* | (2009.01) | |
| *H04W 74/08* | (2009.01) | |
| *H04L 12/24* | (2006.01) | |
| *H04W 16/14* | (2009.01) | |
| *H04W 88/10* | (2009.01) | |
| *H04W 88/08* | (2009.01) | |

(52) U.S. Cl.
CPC ....... *H04W 48/16* (2013.01); *H04W 72/0453* (2013.01); *H04W 74/0808* (2013.01); *H04W 16/14* (2013.01); *H04W 72/0446* (2013.01); *H04W 88/08* (2013.01); *H04W 88/10* (2013.01)

(58) Field of Classification Search
CPC ......... H04W 74/0808; H04W 72/0446; H04W 88/08; H04W 88/10; H04L 41/0803; H04L 5/0048
See application file for complete search history.

(56) References Cited

U.S. PATENT DOCUMENTS

| | | | |
|---|---|---|---|
| 2014/0036818 A1* | 2/2014 | Koskela | H04W 72/1231 370/329 |
| 2014/0194062 A1 | 7/2014 | Palin et al. | |
| 2014/0341018 A1* | 11/2014 | Bhushan | H04W 28/0289 370/230 |
| 2015/0271847 A1 | 9/2015 | Luo et al. | |
| 2015/0341921 A1 | 11/2015 | Chen et al. | |
| 2015/0373682 A1 | 12/2015 | Bashar et al. | |
| 2018/0132259 A1* | 5/2018 | Yi | H04W 72/1215 |

FOREIGN PATENT DOCUMENTS

| | | |
|---|---|---|
| WO | WO 2013/131257 A1 | 9/2013 |
| WO | WO 2013/190168 A1 | 12/2013 |
| WO | WO2014/070066 A1 * | 5/2014 |
| WO | WO 2014/070066 A1 | 5/2014 |
| WO | WO2014070066 * | 5/2014 |

OTHER PUBLICATIONS

R1-114082, titled "Issues Regarding LTE Network for Low Cost MTC", Agenda Item: 7.8 Document for: Discussion and Decision, 3GPP TSG RAN WG1 Meeting #67, (R1-114082 hereinafter) was Published Nov. 14-18, 2011.*
RWS-140016, presented at 3GPP TSG-RAN Workshop on LTE U; Sophia Antipolis, France, Jun. 13, 2014, titled Performance Evaluation of LTE in Unlicensed Spectrum, (RWS-140016 hereinafter) was published Jun. 2014.*
RWS-140031, presented at 3GPP Meeting, titled, "LTE in unlicensed spectrum", in Sophia Antipolis, France, (RWS-140031 hereinafter) was published on Jun. 19 2014. (Year: 2014).*
R1-142985, titled "Coexistence of WAN and D2D", (R1-142985 hereinafter) was originally published by the 3GPP TSG RAN WG1 Meeting #78, which occurred in Dresden, Germany, Aug. 18-22, 2014. (Year: 2014).*
ETSIMCC, "Report of 3GPP Workshop on LTE in Unlicensed Spectrum," 3GPP workshop on LTE-U, RWS-140032, Sophia Antipolis, France, Jun. 13, 2014, pp. 1-17, XP050868322.
Huawei et al., "Coexistence of WAN and D2D", R1-142985, 3GPP TSG RAN WG1 Meeting #78, Aug. 18-22, 2014, Dresden, Germany, See pp. 1, 2.
LG Electronics, "Consideration on LTE operation in unlicensed spectrum", RWS-140031, 3GPP TSG RAN Workshop for LTE Unlicensed band, Jun. 5, 2014, See pp. 9-13.
LG Electronics, "HARQ-ACK transmission shift for D2D and WAN co-existence", R1-143186, 3GPP TSG RAN WG1 Meeting #78, Aug. 18-22, 2014, Dresden, Germany, See p. 1.
Samsung, "Performance Evaluation of LTE in Unlicensed Spectrum", RWS-140016, 3GPP TSG-RAN Workshop on LTU-U, Jun. 13, 2014, Sophia Antipolis, France, See p. 5.

* cited by examiner

[Fig. 1]
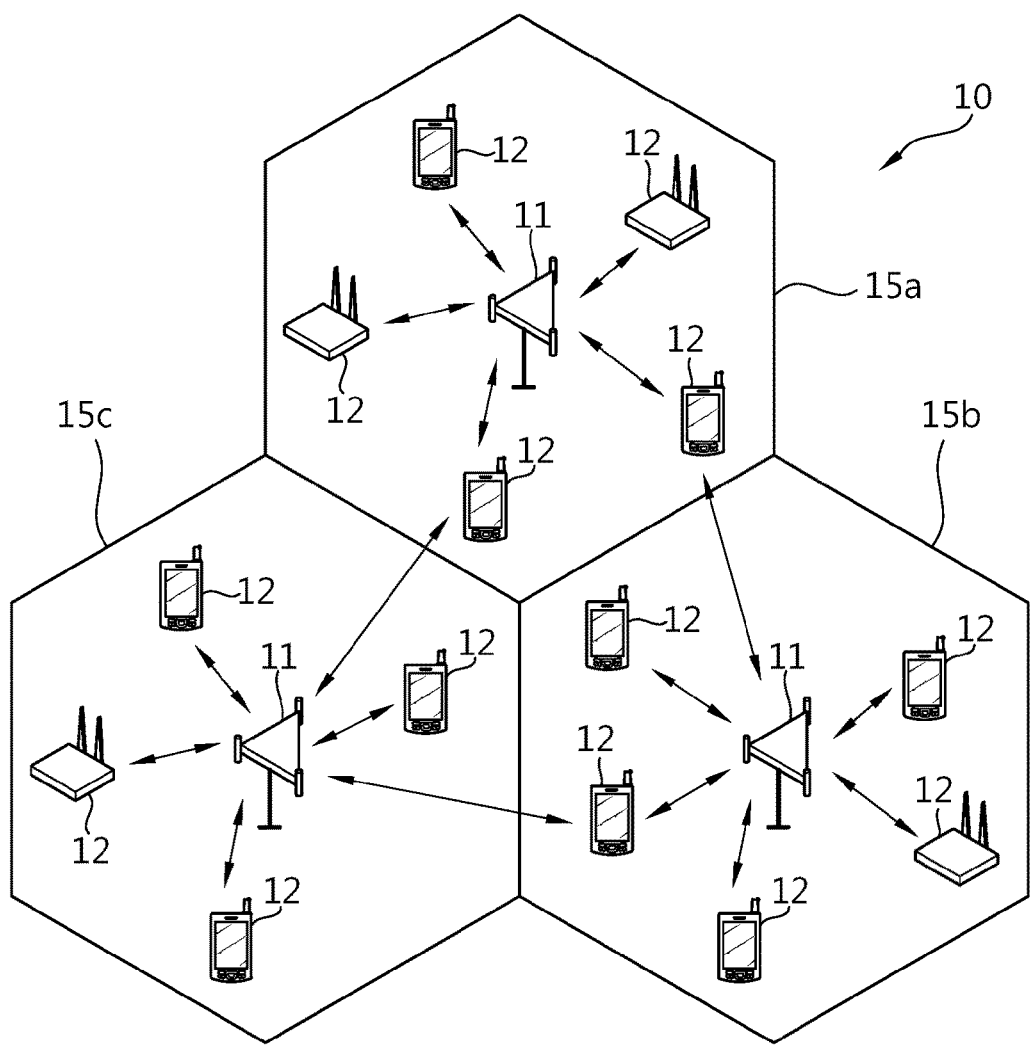
[Fig. 2]
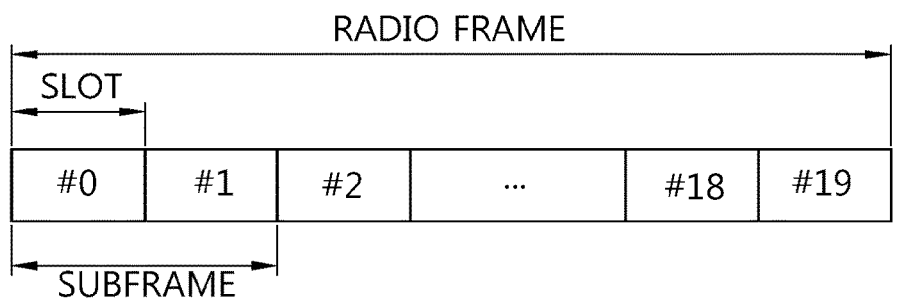

[Fig. 3]
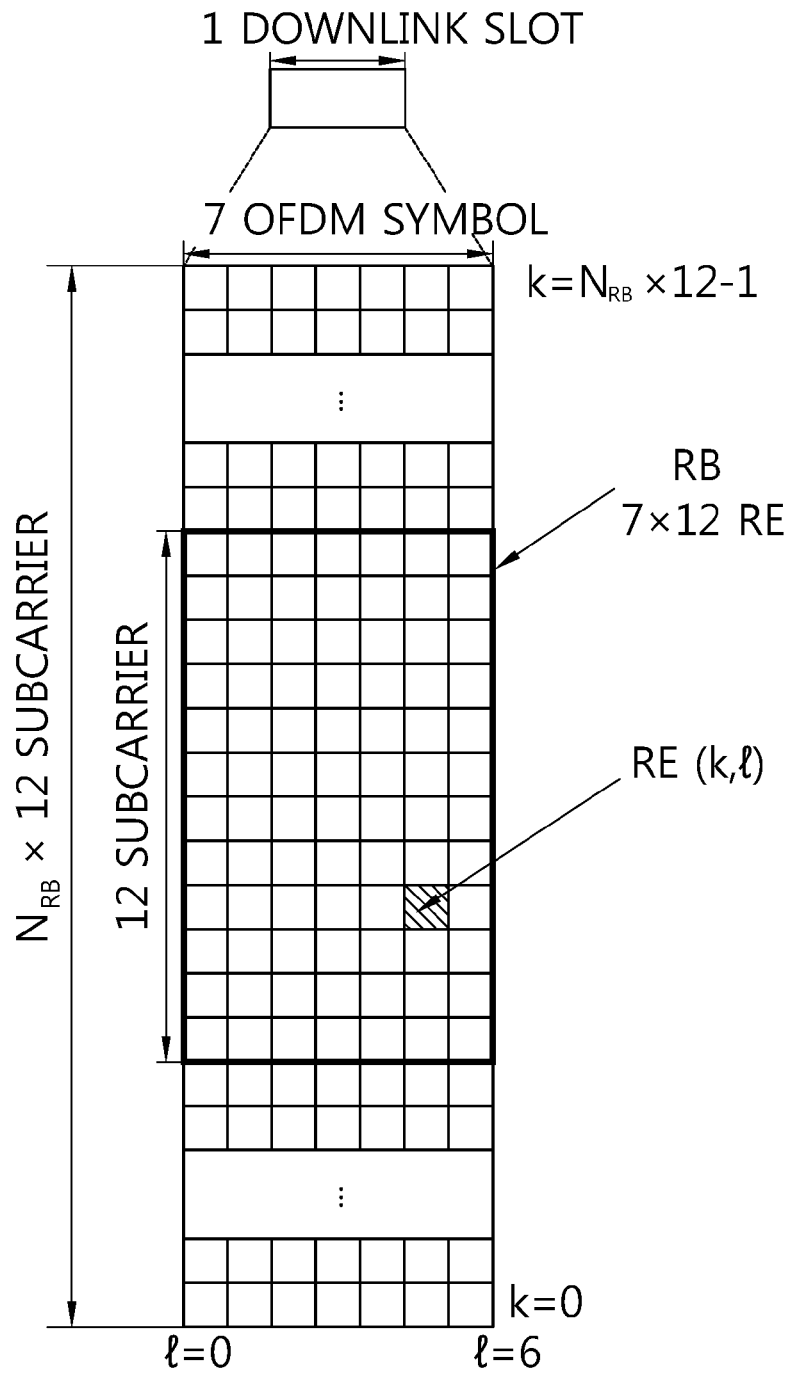

[Fig. 4]
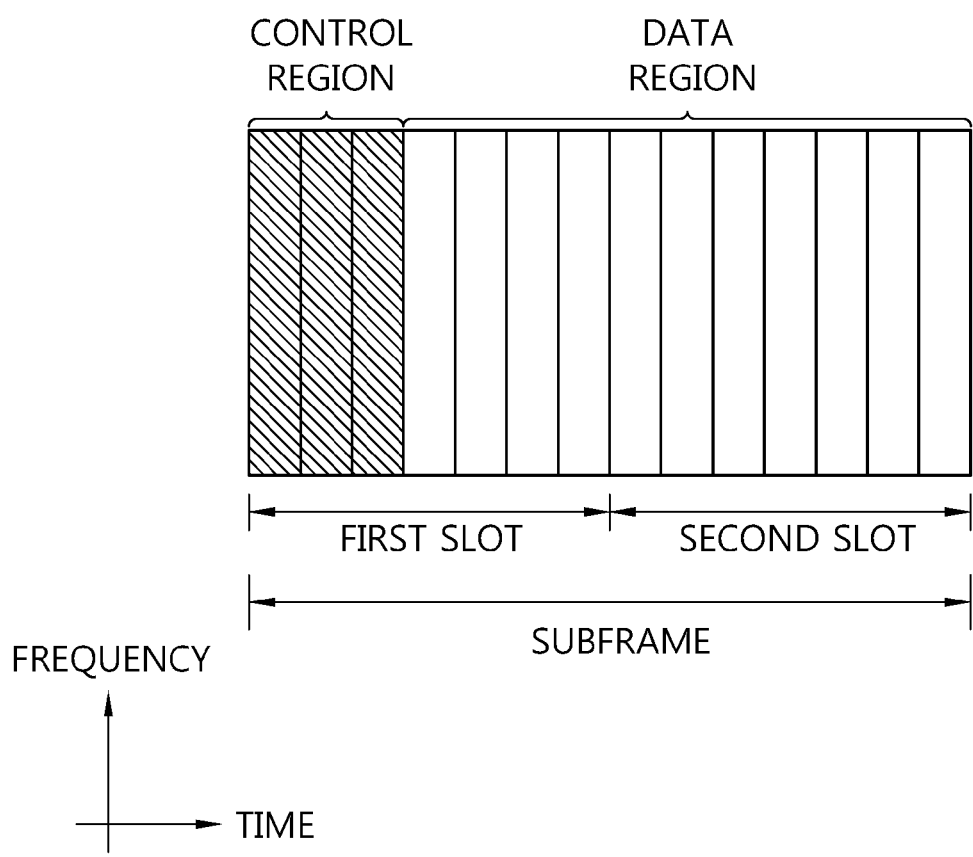

[Fig. 5]
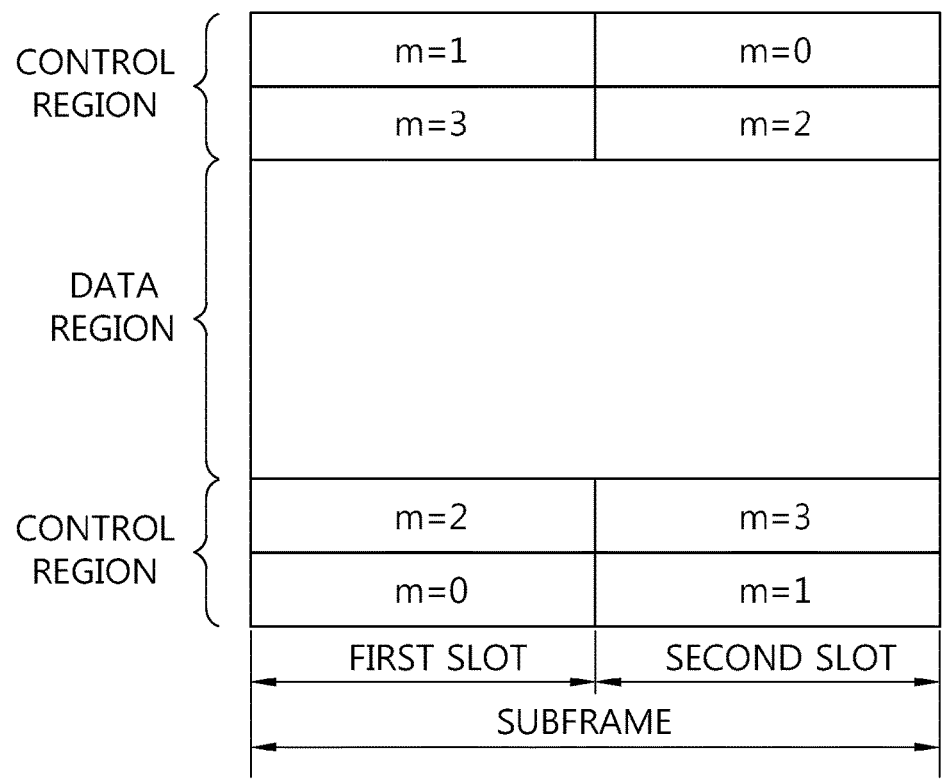
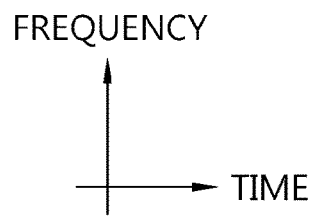

[Fig. 6]
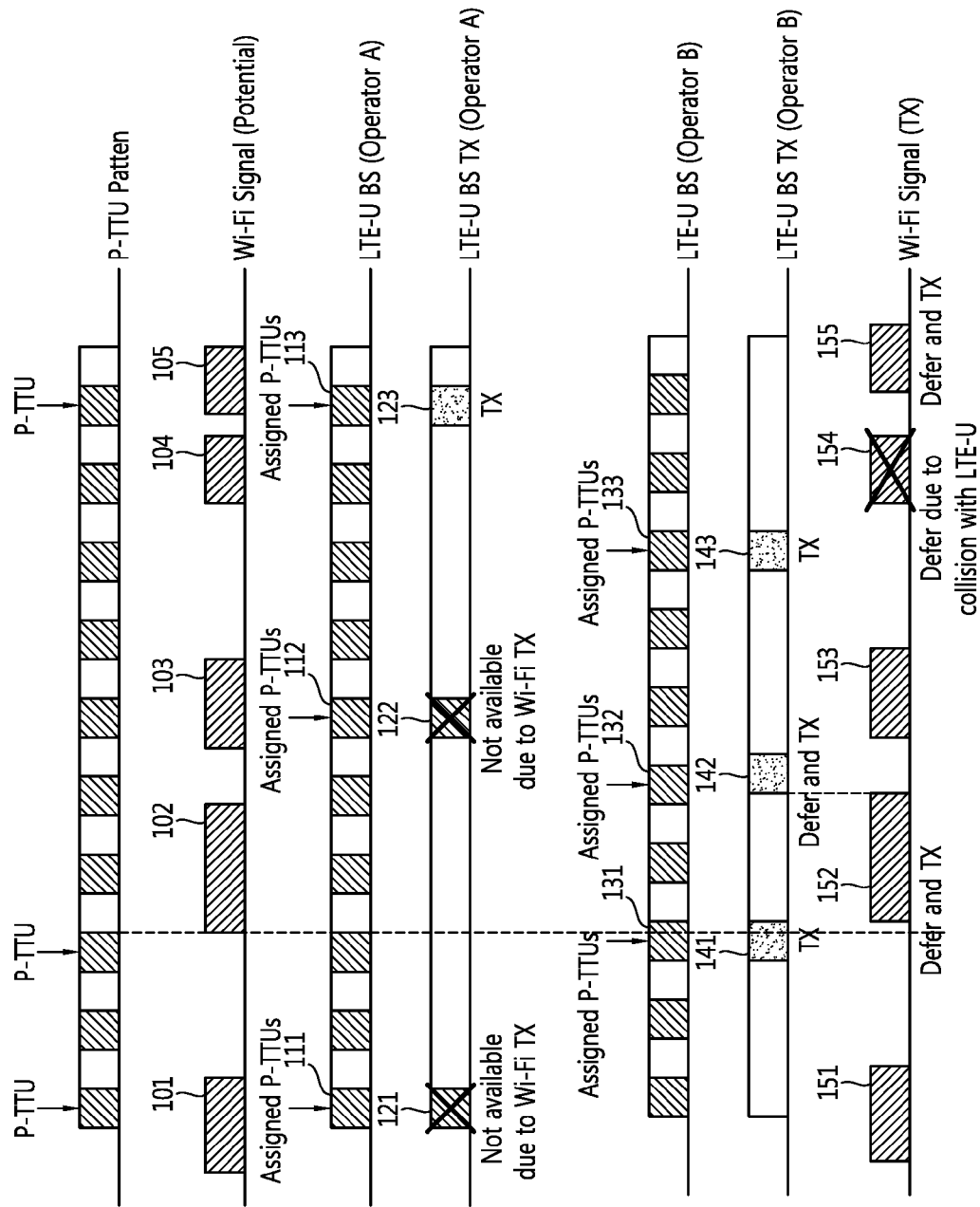

[Fig. 7]
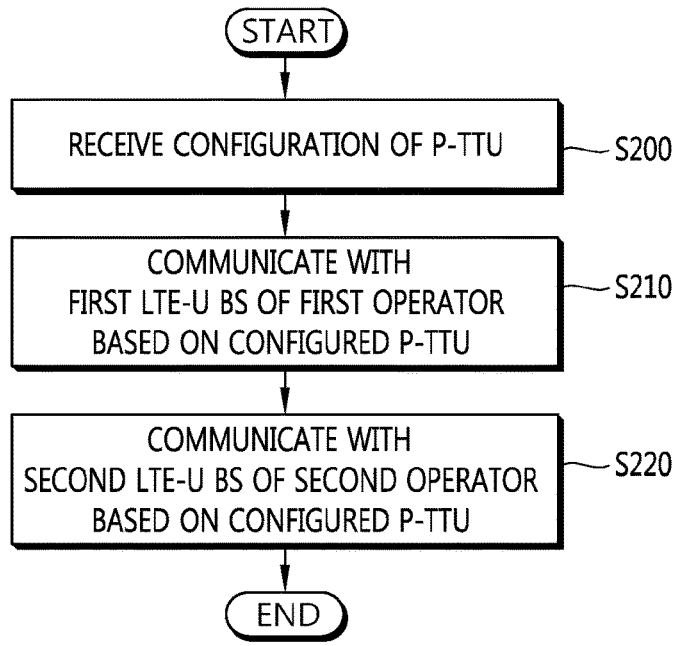
[Fig. 8]
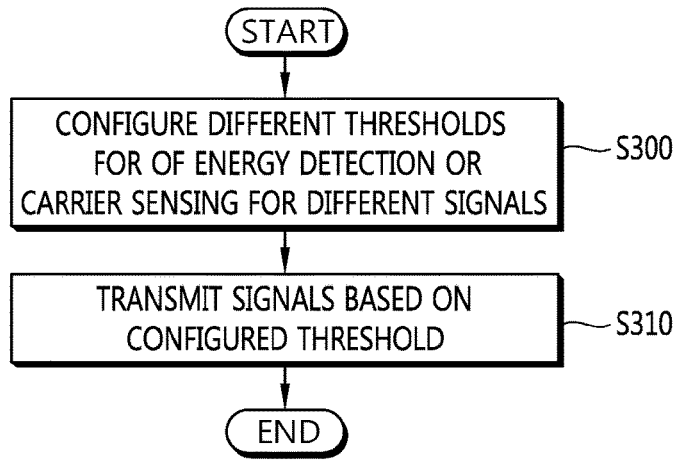
[Fig. 9]
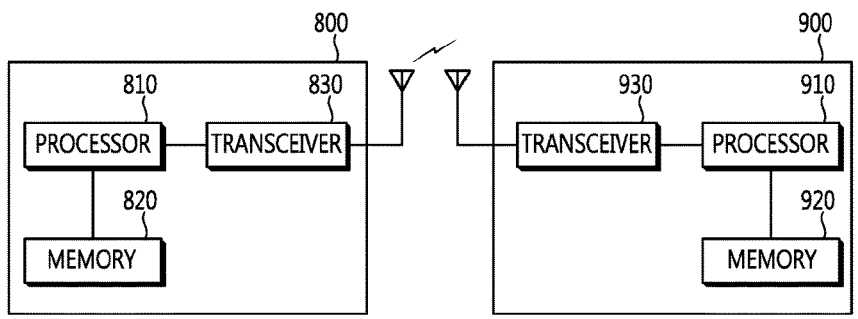

METHOD AND APPARATUS FOR SUPPORTING COEXISTENCE IN UNLICENSED BAND AMONG CELLS OF DIFFERENT OPERATORS IN WIRELESS COMMUNICATION SYSTEM

CROSS REFERENCE TO RELATED APPLICATIONS

This application is the National Phase of PCT International Application No. PCT/KR2015/009632, filed on Sep. 14, 2015, which claims priority under 35 U.S.C. 119(e) to U.S. Provisional Application Nos. 62/049,370 filed on Sep. 12, 2014 and 62/056,442 filed on Sep. 26, 2014, all of which are hereby expressly incorporated by reference into the present application.

TECHNICAL FIELD

The present invention relates to wireless communications, and more particularly, to a method and apparatus for supporting coexistence in an unlicensed band among cells of different operators in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities.

Further, as the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered.

Different base stations of different operators may transmit signals in an unlicensed band, respectively. In this case, how to handle base stations of different operators efficiently may be a problem.

DISCLOSURE OF INVENTION

Technical Problem

The present invention provides a method and apparatus for supporting coexistence in an unlicensed band among cells of different operators in a wireless communication system. The present invention provides a method and apparatus for configuring a potential transmission time unit (P-TTU). The present invention provides a method and apparatus for communicating with different base stations of different operators in an unlicensed band by using the configured P-TTU.

Solution to Problem

In an aspect, a method for communicating, by a user equipment (UE), with a long-term evolution in unlicensed spectrum (LTE-U) base station (BS) in a wireless communication system is provided. The method includes receiving a configuration of a potential transmission time unit (P-TTU), communicating with a first LTE-U BS of a first operator based on the configured P-TTU, and communicating with a second LTE-U BS of a second operator based on the configured P-TTU. The communication with the first LTE-U BS and the communication with the second LTE-U BS is multiplexed by time division multiplexing (TDM).

In another aspect, a user equipment (UE) includes a memory, a transceiver, and a processor coupled to the memory and the transceiver, and configured to control the transceiver to receive a configuration of a potential transmission time unit (P-TTU), control the transceiver to communicate with a first long-term evolution in unlicensed spectrum (LTE-U) base station (BS) of a first operator based on the configured P-TTU, and control the transceiver to communicate with a second LTE-U BS of a second operator based on the configured P-TTU. The communication with the first LTE-U BS and the communication with the second LTE-U BS is multiplexed by time division multiplexing (TDM).

Advantageous Effects of Invention

A user equipment (UE) can communicate efficiently with different base stations of different operators in an unlicensed band.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of allocation of P-TTU and coexistence with potential Wi-Fi signals according to an embodiment of the present invention.
FIG. 7 shows an example of a method for communicating with a LTE-U BS according to an embodiment of the present invention.
FIG. 8 shows an example of a method for transmitting signals according to an embodiment of the present invention.
FIG. 9 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In unlicensed spectrum (or, unlicensed band) where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

To support communication via LTE-U carrier successfully, as it is unlicensed, necessary channel acquisition and completion/collision handling and avoidance are expected. As LTE is designed based on the assumption that a UE can expect DL signals from the network at any given moment (i.e., exclusive use), LTE protocol needs to be tailored to be used in non-exclusive manner. In terms of non-exclusive manner, time may be allocated by semi-statically or statically for channels. For example, during day time, channels may be used by LTE exclusively, and during night time, channels may be not used by LTE. Or, acquiring the channel may be competed dynamically. The reason for the completion is to handle other RAT devices/networks and also other operator's LTE devices/networks.

By the nature of unlicensed band, it is expected that each device using the unlicensed band should apply a type of polite access mechanism not to monopolize the medium and not to interfere on-going transmission. As a basic rule of coexistence between LTE-U devices and Wi-Fi devices, it may be assumed that on-going transmission should not be interrupted or should be protected by proper carrier sensing mechanism. In other words, if the medium is detected as busy, the potential transmitter should wait until the medium becomes idle. The definition of idle may depend on the threshold of carrier sensing range.

In terms of not interfering on-going transmission, from perspective of LTE-U device (including UE and/or LTE-U eNB), two approaches may be considered. The first approach is to understand Wi-Fi signals such that if there is on-going Wi-Fi transmission, the LTE-U device should wait until Wi-Fi transmission ends. The second approach is to treat Wi-Fi signals as noise, and if the noise level is durable, the LTE-U device may attempt transmission. Otherwise, the LTE-U device may skip or wait transmission. In other words, if the detected noise level is beyond what is the normally expected noise level, the LTE-U device may be assumed that there is on-going Wi-Fi transmission, and thus, may wait until the channel becomes cleaner.

Hereinafter, a method for supporting coexistence in an unlicensed band among cells of different operators according to an embodiment of the present invention is described. Throughout the description below, the second approach mentioned above, i.e. treating Wi-Fi signals as noise, is focused. Further, the techniques described below may be applied for intra-operator cells without loss of generality.

Handling interference from Wi-Fi signals according to an embodiment of the present invention is described. It is assumed that the LTE-U device is not able to decode or identify Wi-Fi signals such that it may not be able to decode on-going Wi-Fi transmission. However, it may be assumed that the LTE-U device performs carrier sensing such that it may be able to detect on-going non-LTE and LTE transmission. Based on these assumptions, to handle interference from Wi-Fi signals, if the interference level is below a certain threshold, Wi-Fi signals may be treated as noise. Assuming the same pathloss and the same power between Wi-Fi transmitter and the LTE-U device, if the interference level measured in the LTE-U device is lower than a certain threshold, it may be assumed that Wi-Fi also experiences low interference. Given hidden terminal issue where the potential transmission from the UE may interfere Wi-Fi station's reception, a low threshold may be configured such that it may cover also potentially large carrier sensing range. Regardless of threshold, LTE may determine the following three states:

IDLE—No signal: there is no signal detected at threshold of TH1 (e.g. TH1=−127 dBm)

COEXIST_OTHER—Non-LTE signal presence: there is potentially on-going non-LTE transmission if signal is detected above a threshold TH2 (e.g. TH2=−83 dBm) {and potentially it cannot decode the signal (i.e. non-LTE signal)}

COEXIST_LTE—LTE-signal presence: LTE signal is detected and signal is detected above a threshold TH3 (e.g. TH3=−62 dBm)

For handling of Wi-Fi signal, when the LTE-U device detects COEXIST_OTHER, and if the current time is allocated as potential transmission time unit (P-TTU), the LTE-U device may set very short backoff timer or perform sensing until the channel becomes idle. When the channel becomes idle, the LTE-U device may start transmission. Or, if the current time is not allocated as P-TTU, the LTE-U device may set backoff.

Alternatively, the LTE-U device may perform carrier sensing only in times allocated for P-TTU to reduce carrier sensing overhead.

Configuration of P-TTU according to an embodiment of the present invention is described. In the description, it is assumed that handling of coexistence between LTE and Wi-Fi is achieved via time-division multiplexing (TDM) scheme. For example, LTE and Wi-Fi may share 50% and 50% to utilize the medium. In terms of the ratio, some measurement based metric may be used. For example, the ratio may be determined based on the number of neighbor Wi-Fi devices/APs and/or LTE-U devices. Alternatively, regardless of the number of neighbor Wi-Fi devices/APs and/or LTE-U devices, a predetermined ratio may also be used. For example, LTE may utilize only 20% of time, whereas Wi-Fi may use 80% of time. Or, LTE may utilize 20% of time without competing the channel (or not via listen-before-talk (LBT)), whereas LTE may also utilize the remaining 80% of time based on LBT or other means of shared medium access.

One example configuring P-TTU may be utilizing Wi-Fi protocol, such as point coordination function (PCF) where it may setup exclusive time via PCF reservation. Another example may be implicit coordination between Wi-Fi and LTE, such that LTE may become quiet during Wi-Fi access time unit such that LTE will give opportunity to Wi-Fi access on the medium. When LTE utilizes its P-TTU, it may also transmit or initiate transmit opportunity (TXOP) operation by transmitting such as clear-to-send (CTS)-to-self with medium access/occupation duration.

Since there are multiple LTE-U devices, at least one of followings may be considered for configuring P-TTU.

(1) Each LTE-U eNB may transmit its desired P-TTU pattern. The P-TTU pattern may be determined based on operations, administration and maintenance (OAM), and may be exchanged via backhaul signaling or via other entity (such as mobility management entity (MME)) so that each LTE-U eNB knows each other's P-TTU pattern. Based on system frame number (SFN) information of the other LTE=U eNB and/or P-TTU pattern, if an LTE-U eNB discovers that some potential P-TTU pattern among more than one LTE-U eNB may collide, the LTE-U eNB may decide not to use the colliding P-TTU (with some random probability) or may reduce the power in that P-TTU to minimize the interference to other LTE-U eNBs. Depending on its measurement on potentially WLAN traffic, the ratio of P-TTU compared to the available resource may be dynamically determined and exchanged between LTE-U eNBs.

(2) Each UE may transmit its desired P-TTU pattern to its serving cell. Based on P-TTU pattern from the UE, the network may perform necessary carrier-sensing and/or medium reservation and/or scheduling. P-TTU pattern from the UE may be formed by the UE based on its measurement on WLAN traffic or neighbor APs. For example, if the measurement on neighbor APs indicates that the neighbor WLAN traffic is underutilized (i.e., low interference from Wi-Fi), the UE may configure a bit large portion on P-TTU for LTE-usage. Otherwise, the UE may configure a small percentage on P-TTU. The transmitted P-TTU may also be used for LTE-U eNB transmission where LTE-U eNB may consider those time available for UEs to receive clean signals from the LTE-U eNB, as hidden terminal may not present. One way of guaranteeing P-TTU from UE perspective is to transmit CTS-to-self for each P-TTU.

(3) A set of LTE-U eNBs may form a cluster in which the selected master may determine P-TTU pattern which will be shared by the members in the cluster. The selected master may be selected via OAM or via dynamic selection mechanism. This case may require network synchronization among members. One simple approach for selecting a master is via "first claim wins" rule where the first LTE-U eNB claiming a master wins if there is no other LTE-U eNB claiming the master. In this case, within a P-TTU configured by the master, a subset of P-TTU may be allocated to each LTE-U eNB (i.e. member of the cluster). Or, some coordination mechanisms to share the allocated P-TTU may be applied.

(4) The overlaid macro or primary cell (PCell) may determine P-TTU for LTE-U secondary cell (SCell). PCell may determine P-TTU based on the measurements from LTE-U eNBs and/or UEs. For LTE-U SCell, it may be assumed that the synchronization between LTE-U SCell and PCell is achieved. PCell, depending on other LTE-U eNB's configuration of P-TTU, may determine its P-TTU.

Coordination of P-TTU among different operators according to an embodiment of the present invention is described. Based on the assumption that P-TTU may be shared among cells of different operators, the following mechanisms of sharing may be considered.

(1) Semi-static TDM sharing: Assuming that N cells are sharing P-TTU, semi-static TDM approach may be considered where each cell is configured with an index by the master of the cluster or a controlling device which will be used to determine the location of its assigned P-TTU(s). For example, if a P-TTU pattern has M P-TTU (e.g. one P-TTU is 4 subframes) every 10 seconds, each member may utilize every I-th P-TTU in which I % N is equal to the assigned index. Another approach is that the controlling device may configure M bits of bitmap to each LTE-U eNB where i-th P-TTU resource can be used by the LTE-U eNB if i-th bit is indicated as 1. Or, M bits of bitmap including the index which may use each P-TTU may also be signaled.

(2) Contention-based sharing: Another approach of sharing is to consider reservation based approach via request and response. For example, if P-TTU pattern length is t seconds, each LTE-U eNB may compete for P-TTUs every t seconds. To allow this, M short timeslots may be reserved in the beginning of staring of a P-TTU pattern every t seconds where each LTE-U eNB compete each other in each i-th short timeslot for i-th P-TTU of t seconds.

(3) Hybrid of semi-static and dynamic TDM sharing: Either by a controlling device or by an overlaid macro or by backhaul signaling, semi-static TDM sharing described above may be assigned. Since each cell may or may not have any data to transmit at a given allocated P-TTU, it may be considered to allow dynamic P-TTU swapping or leasing to other cells. For example, it may be assumed that cells labelled as Cell_1, Cell_2, . . . Cell_N share N P-TTU every t seconds. If each cell has any data to transmit (or receive), it may transmit a preamble to indicate that the allocated P-TTU will be used by the cell. If each cell does not have any data to transmit, it may omit transmitting any preamble such that other cells can know P-TTU is not going to be used. Not to allow Wi-Fi device step into the medium since there is no signaling, instead of not transmitting any preamble, the cell may transmit another signal which indicates that there will be no data transmission in that P-TTU. Either by not receiving the preamble indicating potential data transmission in that P-TTU or receiving a signal indicating no transmission in that P-TTU, other cells may be able to utilize the P-TTU.

To avoid potential collision among cells, it may be assumed that cell_N and cell_i (where cell_i is the cell which is allocated to that P-TTU) switch their allocation. In other words, cell_N may utilize i-th P-TTU if it has any data to transmit. If cell_N has no data to transmit, i-th P-TTU may be wasted. Vice versa, if cell_N utilizes i-th P-TTU, N-th P-TTU may be used by cell_i. Alternatively, cells may form a set of pairs such that if one cell in a pair does not utilize the allocated P-TTU, the other cell in the pair may utilize the P-TTU. It is to avoid contention-based access which leads latency as much as possible. However, it may be also based on contention.

To allow multiplexing with Wi-Fi, either by OAM or by coordination, a P-TTU pattern may be formed such as [Cell_1][Wi-Fi][Cell_2] [Wi-Fi][Cell_3][Wi-Fi] . . . [Cell_N][Wi-Fi] where each P-TTU has 5 ms duration and Wi-Fi has, e.g. 5 ms duration. Totally, one P-TTU pattern may comprise 2*N*[P-TTU duration]. In such a case, if Cell_1 does not have any data to transmit, Cell_N may transmit in the first P-TTU.

Since each LTE-cell has different coverage and different neighbors and neighbor Wi-Fi devices, in the reserved P-TTU, each cell except for cell transmitting data may transmit known garbage signals. It is assumed that at the UE-side, if this is used, the known garbage signal may be canceled. To protect on-going Wi-Fi transmission, this known garbage signal may be transmitted only when either the transmitter transmits preamble to indicate the intention of transmission (if the cell switches its allocated P-TTU, the other cell may also transmit preamble to indicate the intention of transmission) or the transmitter transmits known signal" to indicate no data transmission planned in that P-TTU (assuming that the other cell may transmit data without transmitting preamble). If the transmitter performs carrier sensing so that it will not initiate any transmission until the medium is idle, by receiving this preamble or known signal, other cells may assume that the medium becomes idle. However, before transmitting known garbage signal, each cell may also perform carrier sensing where the signal will be transmitted only when the medium is idle.

Once P-TTU pattern is determined, it may be configured/informed to a UE so that the UE may perform its measurement only in the allocated P-TTU for the serving cell. Only P-TTU information of the serving may also be configured. If the P-TTU for neighbor cells is known to the UE, the measurement on neighbor cells may be achieved during P-TTU slots for neighbor cells. In general, it is desirable to align transmission timing for measurement signals among cells where the measurement timing information may be configured to the UE.

FIG. 6 shows an example of allocation of P-TTU and coexistence with potential Wi-Fi signals according to an embodiment of the present invention. Referring to FIG. 6, P-TTU pattern is configured. Wi-Fi signals may be intended to be transmitted potentially in 101, 102, 103, 104 and 105. Among configured P-TTU pattern, P-TTUs 111, 112 and 113 are assigned to the first LTE-U eNB of operator A. However, since P-TTU 111 and 112 is not available due to potential Wi-Fi signal transmission 101 and 103, the first LTE-U eNB cannot transmit LTE signal in 121 and 122. The first LTE-U eNB can transmit LTE signal in 123. Further, among configured P-TTU pattern, P-TTUs 131, 132 and 133 are assigned to the second LTE-U eNB of operator B. P-TTU 131, 132 and potential Wi-Fi signal transmission 102 are slightly overlapped. Accordingly, the second LTE-U eNB can transmit LTE signal in 141, and Wi-Fi signal can be deferred slightly and transmitted in 152. Similarly, the second LTE-U eNB can defer transmission of LTE signal in 142. The second LTE-U eNB can transmit LTE signal in 143. Consequently, Wi-Fi signals can be transmitted in 151 (not deferred), 152 (deferred), 153 (not deferred) and 155 (deferred), and in 154, transmission of Wi-Fi signals may be deferred due to collision with LTE-U.

FIG. 7 shows an example of a method for communicating with a LTE-U BS according to an embodiment of the present invention. In step S200, the UE receives a configuration of a P-TTU. In step S210, the UE communicates with a first LTE-U BS of a first operator based on the configured P-TTU. In step S220, the UE further communicates with a second LTE-U BS of a second operator based on the configured P-TTU. The communication with the first LTE-U BS and the communication with the second LTE-U BS is multiplexed by TDM.

The configured P-TTU may be shared by a plurality of LTE-U BSs including the first LTE-U BS and the second LTE-U BS. The communication with the first LTE-U BS may be performed in a first set of P-TTUs assigned to the first LTE-UB BS based the configured P-TTU, and the communication with the second LTE-U BS may be performed in a second set of P-TTUs assigned to the second LTE-UB BS based the configured P-TTU. The first set of P-TTUs may be assigned to the first LTE-U BS based on a first index configured to the first LTE-U BS, and the second set of P-TTUs may be assigned to the second LTE-U BS based on a second index configured to the second LTE-U BS. The first set of P-TTUs may be assigned to the first LTE-UT BS based on a first bitmap, which indicates location of the first set of P-TTUs, configured to the first LTE-U BS, and the second set of P-TTUs may be assigned to the second LTE-UT BS based on a second bitmap, which indicates location of the second set of P-TTUs, configured to the second LTE-U BS. The first set of P-TTUs and the second set of P-TTUs may be assigned to the first LTE-U BS and the second LTE-U BS based on contention. The first set of P-TTUs and the second set of P-TTUs can be swapped. Further, coordination of P-TTU among different operators according to an embodiment of the present invention described above may be applied to this embodiment.

The UE may further communicate with a device of Wi-Fi based on the configured P-TTU. The communication with the device of Wi-Fi and the communication with the first LTE-U BS and the second LTE-U BS may be multiplexed by TDM. The UE may further perform measurement based on the configured P-TTU for a serving cell.

The configuration of the P-TTU may be determined based on desired P-TTU pattern of each LTE-U BS. The UE may further transmit a desired P-TTU pattern to a serving cell. The configuration of the P-TTU may be received from a master LTE-U BS, among a plurality of LTE-U BSs including the first LTE-U BS and the second LTE-U BS. Further, configuration of P-TTU according to an embodiment of the present invention described above may be applied to this embodiment.

Meanwhile, assuming a type of TDM between different RATs, it may also be feasible to consider operating a limited carrier sensing or listen-before-talk (LBT) for LTE-U operation. This is particularly useful, as LTE is designed based on assumption that the medium is always available. Thus, an efficient mechanism to support LTE-U operation without too much burden on carrier sensing or LBT should be considered.

Another consideration about LBT or energy detection/carrier sensing is whether it needs to be performed every time. For example, P-TTU may be further divided into two subsets where the following uses cases may be considered.

Each set of P-TTUs may use different threshold of detecting "channel busy" when applying energy detection/carrier sensing. For example, one set of P-TTUs may use higher threshold to detect channel busy (and thus aggressively transmit) and the other set of P-TTUs may use lower threshold to detect channel busy (and thus conservatively transmit). Even though it is natural to consider more than two subsets, yet in the description below, two subsets of P-TTUs may be focused for the sake of convenience.

Each set of P-TTUs may use different LBT/CS scheme. For example, one subset of P-TTUs may use LBT or the other subset of P-TTUs may not use LBT. For another example, one subset of P-TTUs may use carrier sensing and the other subset of P-TTUs may use energy detection. For another example, one subset of P-TTUs may use carrier sensing on Wi-Fi signals and the other subset of P-TTUs may use carrier sensing on LTE signals.

Furthermore, considering transmission of periodic cell-common signals such as cell-specific reference signal (CRS), discovery signals or synchronization signals, it may be also considerable that a different threshold of energy detection or carrier sensing is used based on signals contained in the transmission. For example, in a discovery signal occasion which a UE expects to receive discovery signals, the network may use higher threshold for LBT/energy detection such that discovery signal will be transmitted with higher probability (and with higher aggressiveness). If there is data transmission, a network may perform energy detection in both levels (one for discovery signal and the other for data transmission). If energy is detected more than a threshold for data transmission, the network may delay data transmission. Yet, discovery signal may be transmitted if energy detection for discovery signal has been cleared. More aggressively, at least for discovery signal transmission, the network may not perform LBT at all. In that case, it is assumed that discovery signal may not be transmitted with data transmission, unless the network performs LBT before transmitting discovery signal and data such that the channel is assured to be clear. In other words, if the network does not perform LBT for discovery signal, only discovery signal may be transmitted in that period and other signals/data will be delayed. The similar thing may be applied to transmit synchronization signals (e.g. every 5 ms).

However, given the aggressiveness and potential performance impact on other RATs, it is not desirable to use operation often without LBT. Thus, if it is used for discovery signal, it is desirable to increase the periodicity of signal transmission. For that, two sets of discovery signal may also be considered, where the first set of discovery signal may be transmitted without LBT (and thus a UE may assume that discovery signal will be transmitted for sure) and the second set of discovery signal may be transmitted with LBT (and thus a UE may not be able to assume that discovery signals will be transmitted for sure). The second set of discovery signals may be transmitted if the channel is clear.

Furthermore, it is desirable to minimize the duration of discovery signal transmitted without LBT. From now on, it is called as a short discovery signal (S-DRS). Thus, a new type of discovery signal such as discovery signal based on combination of multiple primary synchronization signal (PSS)/secondary synchronization signal (SSS) (e.g. two sets of PSS/SSS, for example, SSS/PSS/CRS/SSS/PSS) or a new preamble may be used for a S-DRS. More specifically, to minimize the required number of OFDM symbols for transmission of S-DRS, based on collaboration from neighboring LTE-U cells, CSI-RS based short discovery signals may be further considered. In other words, S-DRS consist of only channel state information reference signal (CSI-RS) where as normal discovery signal consist of PSS/SSS/CRS/CSI-RS. When it is used, consideration on utilizing dummy signals to protect signals from Wi-Fi interference may be necessary. Yet, to minimize the transmission duration of S-DRS, it is highly desirable to limit S-DRS transmission to only a few OFDM symbols (such as two OFDM symbols only by transmitting CSI-RS in 2nd/3rd OFDM symbols of second slot only).

Alternatively, since discovery signal is important in terms of reliability, different LBT mechanism between CS and energy detection may be also considered. As long as the regulation allows, to improve the reliability, power boosting on S-DRS without LBT may be considered. If a UE has not successfully received S-DRS, it may inform the network via PCell such that additional discovery signals (via LBT operation) may be transmitted to the UE. This may be applied to a serving U-Cell. If the signal quality is poor at subframes determined as discovery signal transmission timing (or DRS occasion for S-DRS without LBT), the UE may notify to the PCell. Given that there is always possibility that Wi-Fi signals may affect S-DRS without LBT, thus, a UE needs to perform filtering based on the reception quality of signals at performing measurement. One possibility is not to use S-DRS received in a subframe where overall signal to noise and interference ratio (SINR) is very low (which may imply that Wi-Fi transmission impacts the transmission)

Consequently, different LBT threshold or mechanism may be considered for message type according to an embodiment of the present invention. In the description above, discovery signals and data are considered as an example, however, the present invention is not limited thereto. Other categorizations may be considered. Generally, message type may be one of synchronization signals, discovery signals, data, cell-common broadcast signal, etc. Further, two types of discovery signal design which may be used with and without LBT or different threshold of LBT may be considered according to an embodiment of the present invention. If discovery signal without LBT is sufficient from UE performance perspective, it may not be necessary to use additional discovery signal. If it is expected for discovery signal transmission without LBT operation, an S-DRS such as by consisting only of CSI-RS may be considered. S-DRS may be transmitted without LBT.

A UE should be able to differentiate between discovery signal transmission without LBT and with LBT, as it may impact the reliability of signals. However, given hidden node, even with LBT, is used unless a UE also senses the channel and a type of reservation, the reliability of discovery signal with LBT and without LBT may not be so different.

FIG. 8 shows an example of a method for transmitting signals according to an embodiment of the present invention. In step S300, the BS operated in unlicensed band configures different thresholds for energy detection or carrier sensing for different signals. In step S310, the BS transmits signals based on the configured thresholds.

The different signals may include a discovery signal and data. The BS may further perform energy detection for the discovery signal and the data. A threshold for the discovery signal may be higher than a threshold for the data. The BS may further delay transmission of the data when a detected energy is higher than the threshold for the data. The BS may further perform LBT before transmitting the discovery signal and the data.

Further, the different signals may include a first discovery signal and a second discovery signal. The first discovery signal may be transmitted with LBT, and the second discovery signal may be transmitted without LBT. The second discovery signal may consist only of CSI RS.

Further, the different signals may further include at least one of a synchronization signal or a CRS.

FIG. 9 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method performed by a user equipment (UE) with a base station (BS) of a first operator in an unlicensed spectrum, the method comprising:
performing carrier sensing on a wireless local area network (WLAN) in a first potential transmission time unit (P-TTU);
detecting a Wi-Fi signal in the first P-TTU;
when an interference level of the Wi-Fi signal is below a threshold, transmitting information on a pattern of the first P-TTU desired by the UE to the BS of the first operator,
wherein the information on the pattern of the first P-TTU includes a time interval in which the UE desires to communicate with the BS of the first operator in the unlicensed spectrum;
receiving information on a pattern of a second P-TTU from the BS of the first operator, in response to the information on the pattern of the first P-TTU,
wherein the information on the pattern of the second P-TTU includes a first set of P-TTUs assigned to the BS of the first operator and a second set of P-TTUs assigned to another BS of a second operator, and
wherein the first set of P-TTUs and the second set of P-TTUs are multiplexed by a time division multiplexing (TDM);
communicating with the BS of the first operator in the first set of P-TTUs;
receiving an indication that there will be no data transmission in the second set of P-TTUs; and
communicating with the BS of the first operator in the second set of P-TTUs, upon receiving the indication.

2. The method of claim 1, wherein the first set of P-TTUs is assigned to the first BS of the first operator based on a first index for the BS of the first operator, and
wherein the second set of P-TTUs is assigned to the another BS of the second operator based on a second index for the another BS of the second operator.

3. The method of claim 1, wherein the first set of P-TTUs is assigned to the BS of the first operator based on a first bitmap, which informs location of the first set of P-TTUs, for the BS of the first operator, and wherein the second set of P-TTUs is assigned to the another BS of the second operator based on a second bitmap, which informs location of the second set of P-TTUs, for the another BS of the second operator.

4. The method of claim 1, wherein the first set of P-TTUs and the second set of P-TTUs are assigned to the BS of the first operator and the another BS of the second operator respectively based on contention.

5. The method of claim 1, wherein the first set of P-TTUs and the second set of P-TTUs can be swapped.

6. The method of claim 1, further comprising communicating with a device of Wi-Fi in a time interval except the pattern of the second P-TTU based on the information on the pattern of the second P-TTU.

7. The method of claim 6, wherein a ratio of the pattern of the second P-TTU to the time interval except the pattern of the second P-TTU is determined based on a number of neighbor Wi-Fi devices and a number of BSs.

8. The method of claim 6, wherein a ratio of the pattern of the second P-TTU to the time interval except the pattern of the second P-TTU is predetermined.

9. The method of claim 1, wherein the pattern of the second P-TTU is determined by a cluster master of a cluster, which includes a plurality of BSs including the BS of the first operator and the another BS of the second operator.

10. A user equipment (UE) for communicating with a base station (BS) of a first operator in an unlicensed spectrum, the UE comprising:
 a memory;
 a transceiver; and
 a processor coupled to the memory and the transceiver, and configured to:
  perform carrier sensing on a wireless local area network (WLAN) in a first potential transmission time unit (P-TTU);
  detect a Wi-Fi signal in the first P-TTU;
  when an interference level of the Wi-Fi signal is below a threshold, control the transceiver to transmit information on a pattern of the first P-TTU desired by the UE to the BS of the first operator,
  wherein the information on the pattern of the first P-TTU includes a time interval in which the UE desires to communicate with the BS of the first operator in the unlicensed spectrum;
  control the transceiver to receive information on a pattern of a second P-TTU from the BS of the first operator, in response to the information on the pattern of the first P-TTU,
  wherein the pattern of the second P-TTU includes a first set of P-TTUs assigned to the BS of the first operator and a second set of P-TTUs assigned to another BS of a second operator, and
  wherein the first set of P-TTUs and the second set of P-TTUs are multiplexed by a time division multiplexing (TDM), and
  control the transceiver to communicate with the BS of the first operator in the first set of P-TTUs;
  control the transceiver to receive an indication that there will be no data transmission in the second set of P-TTUs; and
  control the transceiver to communicate with the BS of the first operator in the second set of P-TTUs, upon receiving the indication.

* * * * *